US006377302B1

(12) United States Patent
Ozaki et al.

(10) Patent No.: US 6,377,302 B1
(45) Date of Patent: Apr. 23, 2002

(54) IMAGE PICKUP APPARATUS WITH ADJUSTABLE IMAGE PICKUP POSTURE

(75) Inventors: Koji Ozaki; Yu Hirono, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/613,908

(22) Filed: Jul. 11, 2000

Related U.S. Application Data

(62) Division of application No. 08/854,171, filed on May 9, 1997.

(30) Foreign Application Priority Data

May 14, 1996 (JP) .............................................. 8-118838
May 16, 1996 (JP) .............................................. 8-121524

(51) Int. Cl.$^7$ ........................... H04N 5/76; H04N 5/335
(52) U.S. Cl. .............. 348/231; 348/333.01; 348/333.06
(58) Field of Search ...................... 348/333.01, 333.06, 348/207, 231, 208, 230, 341, 373; 396/52, 50, 53

(56) References Cited

U.S. PATENT DOCUMENTS

| | | | |
|---|---|---|---|
| 4,757,388 A | * | 7/1988 | Someya et al. .............. 348/373 |
| 5,557,329 A | * | 9/1996 | Lim ............................ 348/373 |
| 5,764,291 A | | 6/1998 | Fullam |
| 5,796,428 A | * | 8/1998 | Matsumoto et al. ......... 348/231 |
| 5,900,909 A | * | 5/1999 | Parulshi ...................... 348/232 |
| 6,262,769 B1 | * | 7/2001 | Anderson et al. ......... 348/333.1 |

FOREIGN PATENT DOCUMENTS

| | | | |
|---|---|---|---|
| JP | 0 406 165 013 A | 4/1992 | |
| JP | 4 041 208 89 A | 6/1994 | |
| JP | 4 061 781 90 A | 6/1994 | |
| JP | 406178190 A | * 6/1994 | .......... H04N/5/232 |
| JP | 4 062 052 72 A | 7/1994 | |
| JP | 0 080 655 66 A | 3/1996 | |
| JP | 0 082 940 37 A | 11/1996 | |

* cited by examiner

Primary Examiner—Wendy R. Garber
Assistant Examiner—Jacqueline Wilson
(74) Attorney, Agent, or Firm—Frommer Lawrence & Haug LLP; William S. Frommer; Dexter T. Chang

(57) ABSTRACT

An image pickup apparatus that includes a body on which an optical system is mounted for facing a subject for an image, a signal generator is rotatably provided for generating an image pickup signal in response to an image of the subject obtained through the optical system, and a rotary driver is mounted for rotating the signal generator in relation to the body on an axis of rotation that is substantially coincident with an optical axis of the optical system. An image pickup signal processor for producing a video signal that represents the subject according to the image pickup signal from the signal generator and a posture detector for detecting a posture of the image generator in relation to the subject.

7 Claims, 15 Drawing Sheets

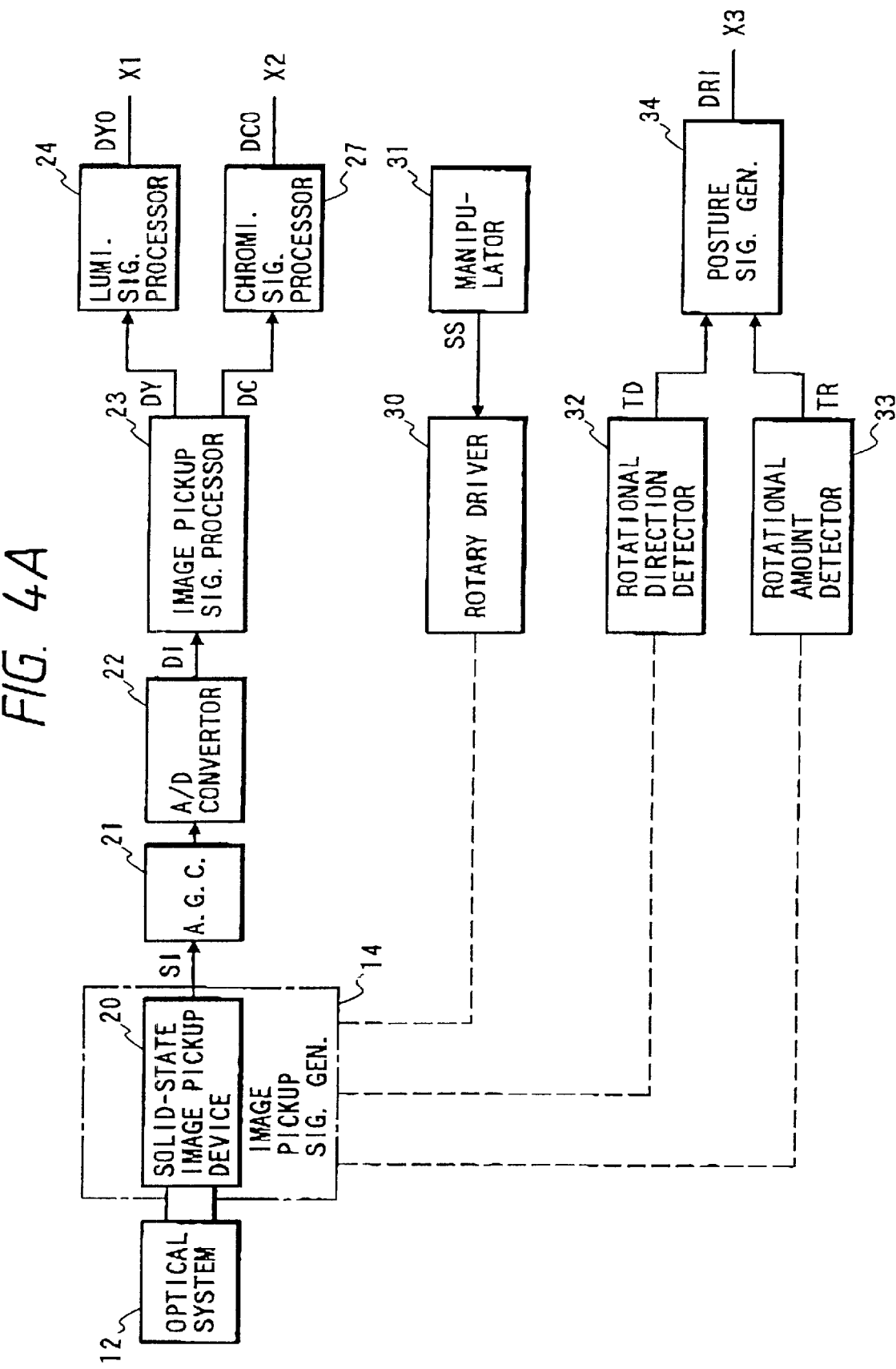

IMAGE PICKUP APPARATUS WITH ADJUSTABLE IMAGE PICKUP POSTURE

This is a division of U.S. Application Ser. No. 08/854,171, filed May 9, 1997.

BACKGROUND OF THE INVENTION

1. Field of the Invention

The present invention relates generally to image pickup apparatus and is directed to improvements in an image pickup apparatus by which an image pickup signal is generated in response to a subject image obtained through an optical system facing toward a subject and then a video signal is produced on the basis of the image pickup signal and which has, as occasion demands, a picture displaying portion for displaying pictures represented by the video signal.

2. Description of the Prior Art

In an image pickup apparatus which produces a video signal, such as a color video signal, on the basis of an image pickup signal generated to correspond to a subject and is commonly called a video camera, an image pickup signal generator which is accompanied with an optical system and in operative to generate an image pickup signal in response to a subject image obtained through the optical system is usually fixed on a body. When such an image pickup apparatus is put to practical use, the image pickup apparatus is set to take up a certain posture by a user or a supporting stand. For example, provided that an image pickup scope is defined by a rectangular image pickup frame, the image pickup apparatus is caused to take up a normal posture by which each of a pair of parallel longer sides of the rectangular image pickup frame is arranged to lie in the horizontal or vertical direction.

The reason why the image pickup apparatus is so postured that each of the parallel longer sides of the rectangular image pickup frame lies in the horizontal or vertical direction on the occasion of practical use is that the image pickup apparatus in a condition of the normal posture is able to be held very easily and stably by the user or the supporting stand. That is, on the occasion of practical use, the image pickup apparatus is supported by the user or the supporting stand in such a manner that an optical system provided on the front side of the image pickup apparatus faces toward a subject and the user looks in at a viewfinder provided on the rear side of the image pickup apparatus from behind, and in such a case, the image pickup apparatus so postured that each of the parallel longer sides of the rectangular image pickup frame lies in the horizontal or vertical direction can be most stably held.

When the image pickup apparatus as aforementioned is used for obtaining video signals based on image pickup signals generated to correspond to various kinds of subjects, it is likely that an image pickup operation by which a scene provided behind a subject is cut out slantwise in relation to the subject or an image pickup operation by which an image of a subject, such as a person in a standing posture, is rotated by a predetermined rotational amount in a predetermined rotational direction is desired in order to provide a picture reproduced based on the video signal obtained through that image pickup operation with a certain specific effect. However, in the case where the image pickup apparatus is set to take up the normal posture by which each of the parallel longer sides of the rectangular image pickup frame is arranged to lie in the horizontal or vertical direction as described above, it is impossible for the image pickup apparatus to perform the image pickup operation by which the scene provided behind the subject is cut out slantwise in relation to the subject or the image pickup operation by which the image of the subject is rotated by a predetermined rotational amount in a predetermined rotational direction.

Then, in this connection, it is considered, as shown in FIG. 1B to incline an image pickup apparatus EC in its entirety to a subject OB postured as shown in FIG. 1A so that each of a pair of parallel longer sides of a rectangular image pickup frame provided in the image pickup apparatus EC is inclined. In such a case, the image pickup operation by which a scene provided behind the subject OB is cut out slantwise in relation to the subject OB can be performed, as shown in FIG. 1C.

However, it is very difficult for a user of the image pickup apparatus EC or a supporting stand for supporting the image pickup apparatus EC to hold appropriately and stably the image pickup apparatus EC postured to be inclined as shown in FIG. 1B over a relatively long period.

On the other hand, in the case where the image pickup apparatus EC is put in an inclined posture to a subject, such as shown in FIG. 1B, during an image pickup operation without any desire to provide a picture reproduced based on a video signal obtained from the image pickup apparatus EC with a certain specific effect, the picture reproduced based on the video signal obtained from the image pickup apparatus EC in the inclined posture is undesirably rotated in its posture clockwise or counterclockwise compared with a picture reproduced based on a video signal obtained from the image pickup apparatus EC which is put in an normal posture by which each of the pair of parallel longer sides of the rectangular image pickup frame provided in the image pickup apparatus EC is arranged to lie in the horizontal or vertical direction.

OBJECTS AND SUMMARY OF THE INVENTION

Accordingly, it is an object of the present invention to provide an image pickup apparatus for generating an image pickup signal in response to a subject image obtained through an optical system facing toward a subject and then producing a video signal on the basis of the image pickup signal, which avoids the aforementioned disadvantage or problem encountered with the prior art.

Another object of the present invention is to provide an image pickup apparatus for generating an image pickup signal in response to a subject image obtained through an optical system facing toward a subject and then producing a video signal on the basis of the image pickup signal, which can perform each of an image pickup operation by which a scene provided behind the subject is cut out slantwise in relation to the subject and an image pickup operation by which the subject image is rotated by predetermined rotational amount in a predetermined rotational direction with a posture which allows the apparatus to be held appropriately and stably by a user or a supporting stand over a relatively long period.

A further object of the present invention is to provide an image pickup apparatus for generating an image pickup signal in response to a subject image obtained through an optical system facing toward a subject and then producing a video signal on the basis of the image pickup signal, which can prevent a picture reproduced based on the video signal obtained on the basis of the image pickup signal from being adversely affected by variations in its posture in an image pickup operation.

A still further object of the present invention is to provide an image pickup apparatus for generating an image pickup signal in response to a subject image obtained through an optical system facing toward a subject and then producing a video signal on the basis of the image pickup signal, which can prevent a picture reproduced based on the video signal obtained on the basis of the image pickup signal from being undesirably rotated in posture clockwise or counterclockwise in response to variations in posture of the apparatus in an image pickup operation.

According to the present invention, there is provided an image pickup apparatus comprising a body on which an optical system is mounted to face toward a subject, an image pickup signal generator provided rotatably in the body for generating an image pickup signal in response to a subject image obtained through the optical system, a rotary driver for causing the image pickup signal generator to rotate in relation to the body on an axis of rotation coincident substantially with an optical axis of the optical system, an image pickup signal processor provided in the body for producing a video signal on the basis of the image pickup signal obtained from the image pickup signal generator, and a posture detector for detecting a posture of the image pickup signal generator in relation to a subject on which the subject image is obtained.

The image pickup apparatus thus constituted according to the present invention may comprise further a video signal compensator provided in the body for compensating the video signal obtained from the image pickup signal processor with a posture signal derived from the posture detector.

Further, the image pickup apparatus thus constituted according to the present invention may comprises also a signal recording portion for recording the video signal obtained from the image pickup signal processor and the posture detection signal derived from the posture detector on a recording medium. The video signal and the posture detection signal recorded on the record medium can be reproduced on occasion.

In accordance with the present invention, there is also provided an image pickup apparatus comprising a body on which an optical system is mounted to face toward a subject, an image pickup signal generator provided in the body for generating an image pickup signal in response to a subject image obtained through the optical system, an image pickup signal processor provided in the body for producing a video signal on the basis of the image pickup signal obtained from the image pickup signal generator, a posture detector for detecting a posture of the image pickup signal generator in relation to a subject on which the subject image is obtained, and a video signal compensator for compensating the video signal obtained from the image pickup signal processor with a posture signal derived from the posture detector.

In accordance with the present invention, there is further provided an image pickup apparatus comprising a video signal producing portion including a body on which an optical system is mounted to face toward a subject, an image pickup signal generator provided in the body for generating an image pickup signal in response to a subject image obtained through the optical system and an image pickup signal processor provided in the body for producing a video signal on the basis of the image pickup signal obtained from the image pickup signal generator, a first posture detector for producing a first posture signal representing a posture of the body constituting the video signal producing portion, a picture displaying portion for displaying the video signal obtained from the video signal producing portion, a second posture detector for producing a second posture signal representing a posture of the picture displaying portion, a video signal compensator for compensating the video signal obtained from the video signal producing portion with the first and second posture signals, and a video signal supplying portion operative to supply the picture displaying portion with a compensated video signal obtained from the video signal compensator.

In the image pickup apparatus constituted in accordance with the present invention as first mentioned above, the image pickup signal generator for generating the image pickup signal in response to the subject image obtained through the optical system is caused to rotate in relation to the body on the axis of rotation coincident substantially with the optical axis of the optical system. Therefore, the image pickup signal generator can be rotated by predetermined rotational amount in relation to the body on the axis of rotation coincident substantially with the optical axis of the optical system either in the clockwise direction or the counterclockwise direction with a posture which allows the apparatus to be held appropriately and stably by a user or a supporting stand.

Then, the video signal produced on the basis of the image pickup signal from the image pickup signal generator which is rotated or not rotated is obtained from the image pickup signal processor and the posture signal corresponding to the posture of the image pickup signal generator in relation to the subject is derived from the posture detector so that the video signal obtained from the image pickup signal processor may be compensated with the posture signal at the video signal compensator to produce a compensated video signal which represents the subject image rotated in response to the rotation of the image pickup signal generator.

Accordingly, with this image pickup apparatus, not only an image pickup operation with, for example, a rectangular image pickup frame, each of a pair of parallel longer sides of which lies in the horizontal or vertical direction, but also each of an image pickup operation by which a scene provided behind the subject is cut out slantwise in relation to the subject and an image pickup operation by which the subject image is rotated by predetermined rotational amount in a predetermined rotational direction can be selectively performed with a posture of the body which allows the apparatus to be held appropriately and stably by a user or a supporting stand for a relatively long time. Besides, a picture corresponding to the subject image rotated in response to the rotation of the image pickup signal generator can be reproduced based on the compensated video signal derived from the video signal compensator.

In the image pickup apparatus constituted in accordance with the present invention as second mentioned above, when the image pickup signal generator provided in the body is changed in its posture, the change in posture of the image pickup signal generator is detected by the posture detector and the posture signal corresponding to the change in posture of the image pickup signal generator is obtained. Then, the video signal obtained from the image pickup signal processor is subjected to compensation with the posture signal at the video signal compensator and a compensated video signal which is not subjected substantially to the influence of the change in posture of the image pickup signal generator is obtained from the video signal compensator as an output video signal. The output video signal thus derived can be supplied to a picture display for reproducing a picture corresponding the subject image.

Accordingly, with this image pickup apparatus, the picture reproduced based on the compensated video signal which is obtained on the basis of the image pickup signal from the image pickup signal generator can be effectively prevented from being adversely affected by variations in posture of the image pickup signal generator in an image pickup operation.

In the image pickup apparatus constituted in accordance with the present invention as third mentioned above, when the video signal representing the subject image is produced by the video signal producing portion and a picture corresponding to the subject image is reproduced based on the video signal by the picture displaying portion, the first posture signal representing the posture of the body constituting the video signal producing portion is obtained from the first posture detector and the second posture signal representing the posture of the picture displaying portion is obtained from the second posture detector. Then, the video signal obtained from the video signal producing portion is compensated with the first and second posture signals at the video signal compensator and the compensated video signal obtained from the video signal compensator is supplied through the video signal supplying portion to the picture displaying portion. Therefore, a picture corresponding to the subject image is reproduced based on the compensated video signal at the picture displaying portion.

With the compensation to the video signal obtained from the video signal producing portion with the first and second posture signals, the subject image represented by the compensated video signal is, for example, rotated, compared with the subject image represented by the video signal obtained from the video signal producing portion, in response to the posture of the body constituting the video signal producing portion represented by the first posture signal and to the posture of the picture displaying portion represented by the second posture signal, so that the picture reproduced based on the compensated video signal at the picture displaying portion is prevented from being undesirably rotated in posture clockwise or counterclockwise in response to variations in posture of each of the body constituting the video signal producing portion and the picture displaying portion in an image pickup operation.

The above, and other objects, features and advantages of the present invention will become apparent from the following detailed description taken in conjunction with the accompanying drawings.

BRIEF DESCRIPTION OF THE DRAWINGS

FIGS. 4A and 4B are block diagrams showing an embodiment of image pickup apparatus according to the present invention;

DESCRIPTION OF THE PREFERRED EMBODIMENTS

Figure 1A:
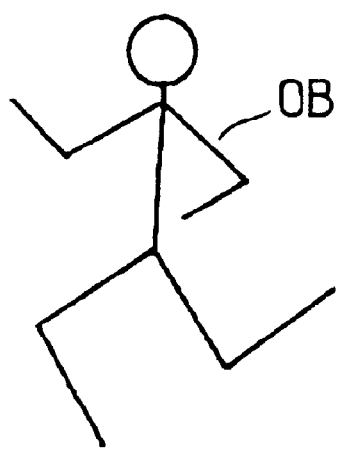
FIGS. 1A to 1C are illustrations used for explaining an image pickup operation of a previously proposed image pickup apparatus.
Figure 1B:
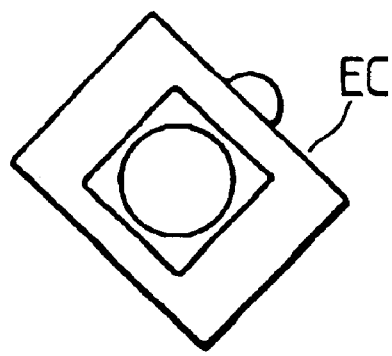
Figure 1C:
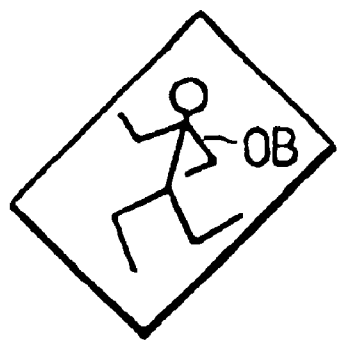
Figure 2:
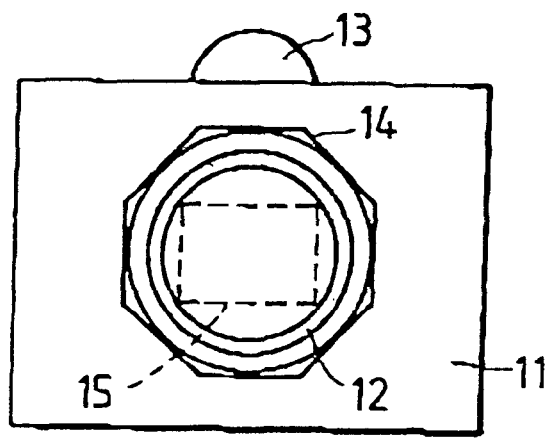
FIG. 2 is a schematic front view showing an embodiment of image pickup apparatus according to the present invention.

FIG. 2 shows a front external view of an embodiment of image pickup apparatus according to the present invention.

Referring to FIG. 2, the embodiment has a body 11 on which an optical system 12 containing a plurality of lenses, an iris diaphragm, a focus control mechanism and so on is mounted to extend forward and a viewfinder 13 is also mounted to allow an user of the embodiment to look in thereat from behind. Further, an image pickup signal generator 14 operative to generate an image pickup signal in response to a subject image obtained through the optical system 12 is provided to the body 11.

The image pickup signal generator 14 comprises a solid-state image pickup device and arranged to be rotatable in relation to the body 11 on an axis of rotation coincident substantially with an optical axis of the optical system 12 either in the clockwise direction and the counterclockwise direction. That is, the image pickup signal generator 14 is able to take up selectively such a position as shown in FIG. 2 at which each of a pair of parallel longer sides of a rectangular image pickup frame 15 lies in the horizontal direction (a reference position) and such a position as shown in FIG. 3 to which each of the parallel longer sides of the rectangular image pickup frame 15 is rotated clockwise or counterclockwise by a certain rotational amount (in the case of FIG. 3, clockwise by 60 degrees) from the horizontal direction.

The rotation of the image pickup signal generator 14 on the axis of rotation coincident substantially with the optical axis of the optical system 12 in relation to the body 11 is carried out by a rotary driver provided in the body 11.

Figure 3:
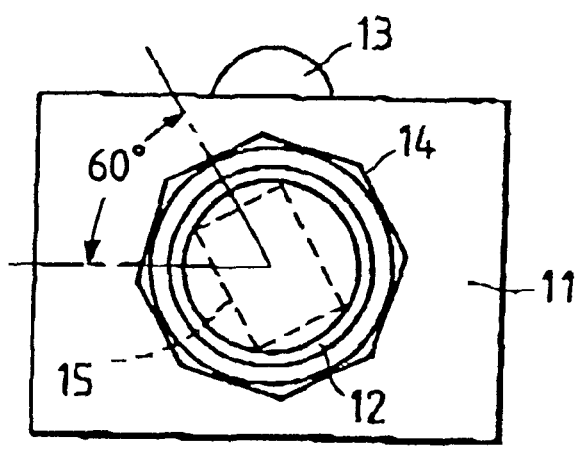
FIG. 3 is a schematic front view showing an embodiment of image pickup apparatus according to the present invention.
Figure 4B:
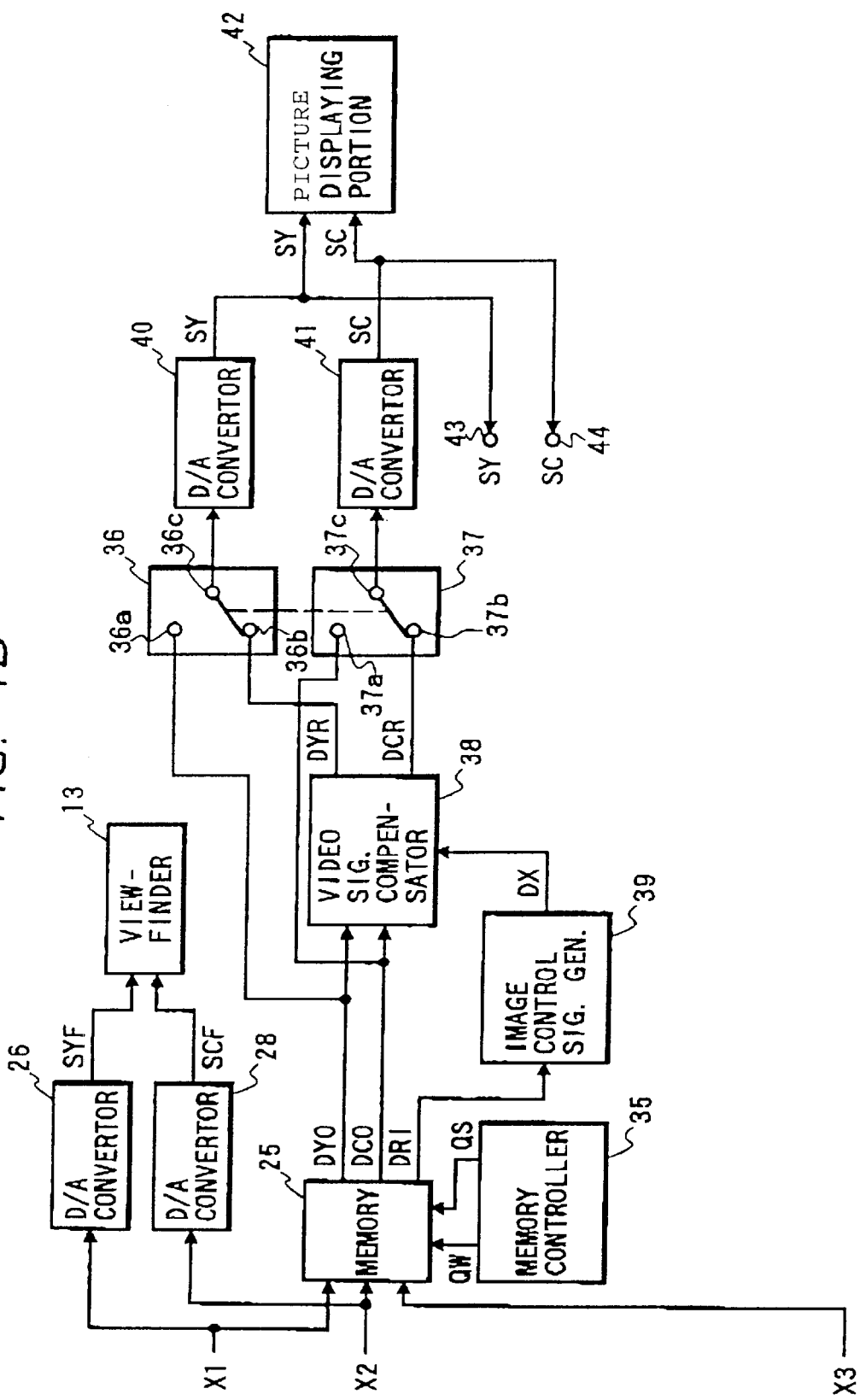

FIGS. 4A and 4B show schematically the structure of the embodiment of image pickup apparatus according to the present invention having its external appearance as shown in FIGS. 2 and 3.

Referring to FIGS. 4A and 4B, the image pickup signal generator 14 accompanied with the optical system 12 contains a solid-state image pickup device 20. The solid-state image pickup device 20 has a light receiving portion operative to receive a light coming through the optical system 12 from a subject and perform photo-electric conversion in response to the light received thereby to produce electric charge, a charge transfer portion composed of a group of charge coupled devices (CCDs) for transferring the electric charge produced in the light receiving portion, and an output portion for generating an output signal corresponding to the electric charge transferred by the charge transfer portion. The output signal obtained from the output portion of the solid-state image pickup device 20 is derived from the image pickup signal generator 14 as an image pickup signal SI generated in response to a subject image obtained through the optical system 12.

The image pickup signal SI obtained from the image pickup signal generator 14 is amplified at an automatic gain control portion (A. G. C.) 21 and then supplied to an analog to digital (A/D) convertor 22. In the A/D convertor 22, the image pickup signal SI from the automatic gain control portion 21 is digitalized with predetermined sampling frequency to produce a digital image pickup signal DI. Then, the digital image pickup signal DI obtained from the A/D convertor 22 is supplied to an image pickup signal processor 23.

The digital image pickup signal DI from the A/D convertor 22 is subjected to various signal processings in the image pickup signal processor 23 and a digital luminance signal DY and a digital chrominance signal DC which constitute a digital color video signal are derived from the image pickup signal processor 23. The digital luminance signal DY is subjected to various signal processings including processing for improving definition, processing for Gamma correction, processing for adding synchronous signals and so on in a luminance signal processor 24 to be converted into a digital luminance signal DYO which is supplied to each of a memory 25 and a digital to analog (D/A) converter 26. The digital chrominance signal DC is subjected to various signal processings including processing for encoding in a chrominance signal processor 27 to be converted into a digital chrominance signal DCO which is supplied to each of the memory 25 and a D/A converter 28.

In the D/A convertor 26, the digital luminance signal DYO is converted into an analog luminance signal SYF to be supplied to the viewfinder 13. Similarly, in the D/A convertor 28, the digital chrominance signal DCO is converted into an analog chrominance signal SCF to be supplied to the viewfinder 13. In the viewfinder 13, a picture corresponding to the subject which is captured in the rectangular image pickup frame 15 and subjected to the image pickup operation by the solid-state image pickup device 20 in the image pickup signal generator 14, is reproduced to be displayed.

In the embodiment shown in FIGS. 4A and 4B, a rotary driver 30 which is operative to cause the image pickup signal generator 14 to rotate clockwise or counterclockwise in relation to the body 11 on the axis of rotation coincident substantially with the optical axis of the optical system 12, is also provided to engage with the image pickup signal generator 14. The rotary driver 30 is connected with a manipulator 31 which is handled by the user of the embodiment and operates in response to a rotation control signal SS obtained from the manipulator 31 to rotate the image pickup signal generator 14 clockwise or counterclockwise in relation to the body 11 so that the image pickup signal generator 14 takes up selectively the reference position and a position rotated in relation to the body 11 by a predetermined rotational amount from the reference position.

Further, a rotational direction detector 32 and a rotational amount detector 33 are provided in connection with the image pickup signal generator 14. The rotational direction detector 32 is operative to detect a rotational direction of the image pickup signal generator 14 and produce a detection output signal TD corresponding to the rotational direction detected thereby when the image pickup signal generator 14 is rotated by the rotary drive 30. The rotational amount detector 33 is operative to detect a rotational amount represented with angle of rotation of the image pickup signal generator 14 rotated by the rotary driver 30 and produce a detection output signal TR corresponding to the rotational amount detected thereby. The detection output signal TD derived from the rotational direction detector 32 and the detection output signal TR derived from the rotational amount detector 33 are supplied to a posture signal generator 34. In the posture signal generator 34, a posture signal DRI corresponding to a posture of the image pickup signal generator 14 in relation to the subject, which is represented by the rotational direction and amount of the image pickup signal generator 14, is formed based on the detection output signals TD and TR. The posture signal DRI obtained from the posture signal generator 34 is supplied to the memory 25. The rotational direction detector 32, the rotational amount detector 33 and the posture signal generator 34 in the aggregate constitute a posture detector for detecting the posture of the image pickup signal generator 14 in relation to the subject and producing the posture signal DRI corresponding to the detected posture which is represented with the rotational direction detected by the rotational direction detector 32 and the rotational amount detected by the rotational amount detector 32.

The memory 25 is accompanied with a memory controller 35 for supplying the memory 25 with a writing control signal QW and a reading control signal QS. The digital luminance signal DYO from the luminance signal processor 24, the digital chrominance signal DCO from the chrominance signal processor 27 and the posture signal DRI from the posture signal generator 34 are written to be stored in the memory 25 in accordance with the writing control signal QW, and each of the digital luminance signal DYO, the digital chrominance signal DCO and the posture signal DRI stored in the memory 25 is read from the memory 25 in accordance with the reading control signal QS.

The digital luminance signal DYO and the digital chrominance signal DCO read from the memory 25 are supplied to a selective contact 36a of a switch 36 and a selective contact 37a of a switch 37, respectively, and further supplied to a video signal compensator 38. The posture signal DRI read from the memory 25 is supplied to an image control signal generator 39.

An image control signal DX is produced based on the posture signal DRI to correspond to the posture of the image pickup signal generator 14 which is represented with the rotational direction and amount of the image pickup signal generator 14 in the image control signal generator 39 and supplied to the video signal compensator 38. In the video signal compensator 38, the digital luminance signal DYO and digital chrominance signal DCO constituting the digital color video signal are controlled by the image control signal DX to be subjected to compensation in response to the posture represented with the rotational direction and amount of the image pickup signal generator 14 to produce a compensated digital luminance signal DYR and a compensated digital chrominance signal DCR. With this compensation to the digital luminance signal DYO and digital chrominance signal DCO with the image control signal DX, a subject represented by the compensated digital luminance signal DYR and compensated digital chrominance signal DCR is rotated, compared with the subject represented by the digital luminance signal DYO and digital chrominance signal DCO, by a certain rotational amount substantially equal to the rotational amount of the image pickup signal generator 14 in a rotational direction opposite to the rotational direction of the image pickup signal generator 14.

The compensated digital luminance signal DYR and compensated digital chrominance signal DCR obtained from the video signal compensator 38 are supplied to a selective contact 36b of the switch 36 and a selective contact 37b of the switch 37, respectively. A movable contact 36c of the switch 36 and a movable contact 37c of the switch 37 are linked in operation with each other.

When the movable contact 36c is connected with the selective contact 36a in the switch 36 and simultaneously the movable contact 37c is connected with the selective contact 37a in the switch 37, the digital luminance signal DYO and digital chrominance signal DCO read from the memory 25 are obtained at the movable contact 36c of the switch 36 and the movable contact 37c of the switch 37, respectively. The digital luminance signal DYO obtained at the movable contact 36c of the switch 36 is converted into an analog luminance signal SY in a D/A convertor 40 and the digital chrominance signal DCO obtained at the movable contact 37c of the switch 37 is converted into an analog chrominance signal SC in a D/A convertor 41.

On the other hand, when the movable contact 36c is connected with the selective contact 36b in the switch 36 and simultaneously the movable contact 37c is connected with the selective contact 37b in the switch 37, the compensated digital luminance signal DYR and compensated digital chrominance signal DCR obtained from the video signal compensator 38 are obtained at the movable contact 36c of the switch 36 and the movable contact 37c of the switch 37, respectively. The compensated digital luminance signal DYR obtained at the movable contact 36c of the switch 36 is converted into the analog luminance signal SY in the D/A convertor 40 and the compensated digital chrominance signal DCR obtained at the movable contact 37c of the switch 37 is converted into the analog chrominance signal SC in the D/A convertor 41.

The analog luminance signal SY obtained based on the digital luminance signal DYO or the compensated digital luminance signal DYR and the analog chrominance signal SC obtained based on the digital chrominance signal DCO or the compensated digital chrominance signal DCR, which constitute an analog color video signal, are supplied to a picture displaying portion 42 and transferred to video signal output terminals 43 and 44, respectively. In the picture displaying portion 42, a picture represented by the color video signal which is constituted with the analog luminance signal SY based on the digital luminance signal DYO and the analog chrominance signal SC based on the digital chrominance signal DCO is displayed to be reproduced when the movable contact 36c is connected with the selective contact 36a in the switch 36 and simultaneously the movable contact 37c is connected with the selective contact 37a in the switch 37, and a picture represented by the color video signal which is constituted with the analog luminance signal SY based on the compensated digital luminance signal DYR and the analog chrominance signal SC based on the compensated digital chrominance signal DCR is displayed to be reproduced when the movable contact 36c is connected with the selective contact 36b in the switch 36 and simultaneously the movable contact 37c is connected with the selective contact 37b in the switch 37.

The picture represented by the color video signal which is constituted with the analog luminance signal SY based on the digital luminance signal DYO and the analog chrominance signal SC based on the digital chrominance signal DCO corresponds directly to the subject from which the image pickup signal SI is generated by the solid-state image pickup device 20 in the image pickup signal generator 14. On the other hand, the picture represented by the color video signal which is constituted with the analog luminance signal SY based on the compensated digital luminance signal DYR and the analog chrominance signal SC based on the compensated digital chrominance signal DCR corresponds to the subject which is rotated by the rotational amount substantially equal to the rotational amount of the image pickup signal generator 14 in the rotational direction opposite to the rotational direction of the image pickup signal generator 14, compared with the subject from which the image pickup signal SI is generated by the solid-state image pickup device 20 in the image pickup signal generator 14.

In such a manner as mentioned above, under a condition in which the image pickup signal generator 14 is set to take up the reference position with which the image pickup signal generator 14 is not rotated or the position with which the image pickup signal generator 14 is rotated from the reference position, the digital luminance signal DYO and digital chrominance signal DCO constituting the color video signal which represents the subject from which the image pickup signal SI is generated by the solid-state image pickup device 20 in the image pickup signal generator 14 and the posture signal DRI corresponding to the posture of the image pickup signal generator 14 which is represented with the rotational direction and amount of the image pickup signal generator 14, are obtained. Then, the analog luminance signal SY and analog chrominance signal SC constituting the analog color video signal which represents the picture corresponding directly to the subject from which the image pickup signal SI is generated by the solid-state image pickup device 20 in the image pickup signal generator 14 or corresponding to the subject which is rotated by the rotational amount substantially equal to the rotational amount of the image pickup signal generator 14 in the rotational direction opposite to the rotational direction of the image pickup signal generator 14, compared with the subject from which the image pickup signal SI is generated by the solid-state image pickup device 20 in the image pickup signal generator 14, are produced and the picture represented by the analog luminance signal SY and analog chrominance signal SC is displayed the picture displaying portion 42.

Figure 5A:
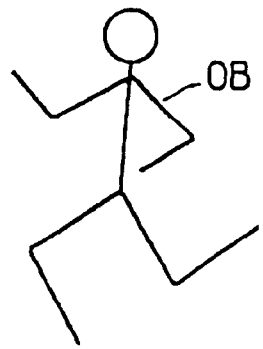
FIGS. 5A to 5E are illustrations used for explaining an image pickup operation of the embodiment shown in FIGS. 4A and 4B.
Figure 5B:
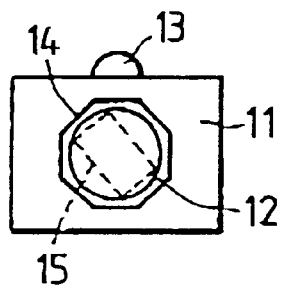
Figure 5C:
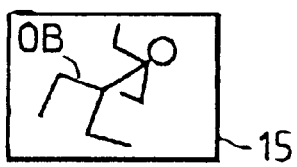

When the embodiment shown in FIGS. 4A and 4B is so set in relation to a subject OB postured as shown in FIG. 5A that the image pickup signal generator 14 is rotated in relation to the body 11 from the reference position by a certain rotational amount in the clockwise or counterclockwise direction on the axis of rotation coincident substantially with the optical axis of the optical system 12 to take up such a position as shown in FIG. 5B (in the case of FIG. 5B, the image pickup signal generator 14 has been rotated from the reference position by approximately 45 degrees in the clockwise direction) and then the solid-state image pickup device 20 in the image pickup signal generator 14 is put in the image pickup operation, the subject OB is captured in the rectangular image pickup frame 15 which has its parallel longer sides each lying in the direction rotated by, for example, approximately 45 degrees from the horizontal direction in the clockwise direction and the user of the embodiment shown in FIGS. 4A and 4B looking in at the viewfinder 13 observes the subject OB rotated by approximately 45 degrees in the clockwise direction in the rectangular image pickup frame 15 having its parallel longer sides each lying in the horizontal direction, as shown in FIG. 5C.

Figure 5D:
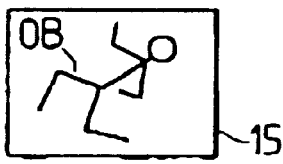

In this case, the digital luminance signal DYO and digital chrominance signal DCO constituting the digital color video signal which represents the subject OB rotated by approximately 45 degrees in the clockwise direction and captured in the rectangular image pickup frame 15 are obtained from the luminance signal processor 24 and the chrominance signal processor 27, respectively. Accordingly, when the movable contact 36c is connected with the selective contact 36a in the switch 36 and simultaneously the movable contact 37c is connected with the selective contact 37a in the switch 37, the analog luminance signal SY and analog chrominance signal SC constituting the analog video signal which represent the subject OB rotated in accordance with the rotation of the image pickup signal generator 14 in relation to the body 11 in the rectangular image pickup frame 15 having its parallel longer sides each lying in the horizontal direction, as shown in FIG. 5D, are obtained from the D/A convertors 40 and 41, respectively, based on the digital luminance signal DYO and digital chrominance signal DCO. On the other hand, when the movable contact 36c is connected with the selective contact 36b in the switch 36 and simultaneously the movable contact 37c is connected with the selective contact 37b in the switch 37, the analog luminance signal SY and analog chrominance signal SC constituting the analog video signal which represent the subject OB rotated, compared with the subject OB shown in FIG. 5D, by the rotation amount substantially equal to the rotational amount of the image pickup signal generator 14 in the rotational direction opposite to the rotational direction of the image pickup signal generator 14 in the rectangular image pickup frame 15 by which the scene provided behind the subject OB is cut out slantwise in relation to the subject OB, as shown in FIG. 5E, are obtained from the D/A convertors 40 and 41, respectively, based on the compensated digital luminance signal DYR and compensated digital chrominance signal DCR derived from the video signal compensator 38.

Figure 5E:
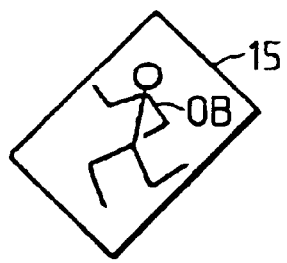

As a result, a picture corresponding to the subject OB rotated in accordance with the rotation of the image pickup signal generator 14 in relation to the body 11 in the rectangular image pickup frame 15 having its parallel longer sides each lying in the horizontal direction, as shown in FIG. 5D, is displayed in the picture displaying portion 42 when the movable contact 36c is connected with the selective contact 36a in the switch 36 and simultaneously the movable contact 37c is connected with the selective contact 37a in the switch 37, and a picture corresponding to the subject OB rotated, compared with the subject OB shown in FIG. 5D, by the rotation amount substantially equal to the rotational amount of the image pickup signal generator 14 in the rotational direction opposite to the rotational direction of the image pickup signal generator 14 in the rectangular image pickup frame 15 by which the scene provided behind the subject OB is cut out slantwise in relation to the subject OB, as shown in FIG. 5E, namely, a picture corresponding to the subject OB which corresponds substantially to the subject shown in FIG. 5A, is displayed in the picture displaying portion 42 when the movable contact 36c is connected with the selective contact 36b in the switch 36 and simultaneously the movable contact 37c is connected with the selective contact 37b in the switch 37.

On this occasion, the body 11 is put continuously in such a posture as shown in FIG. 5B, regardless of the rotation of the image pickup signal generator 14, and therefore able to be supported appropriately and stably by the user or a supporting stand for a relatively long time. Consequently, with the embodiment shown in FIGS. 4A and 4B, not only the image pickup operation with the rectangular image pickup frame 15 which has its parallel longer sides each lying in the horizontal direction but also the image pickup operation with the rectangular image pickup frame 15 which has its parallel longer sides each lying in any direction rotated from the horizontal direction can be selectively performed with the posture of the body 11 which allows the embodiment to be held appropriately and stably by the user or the supporting stand for a relatively long time.

Figure 6:
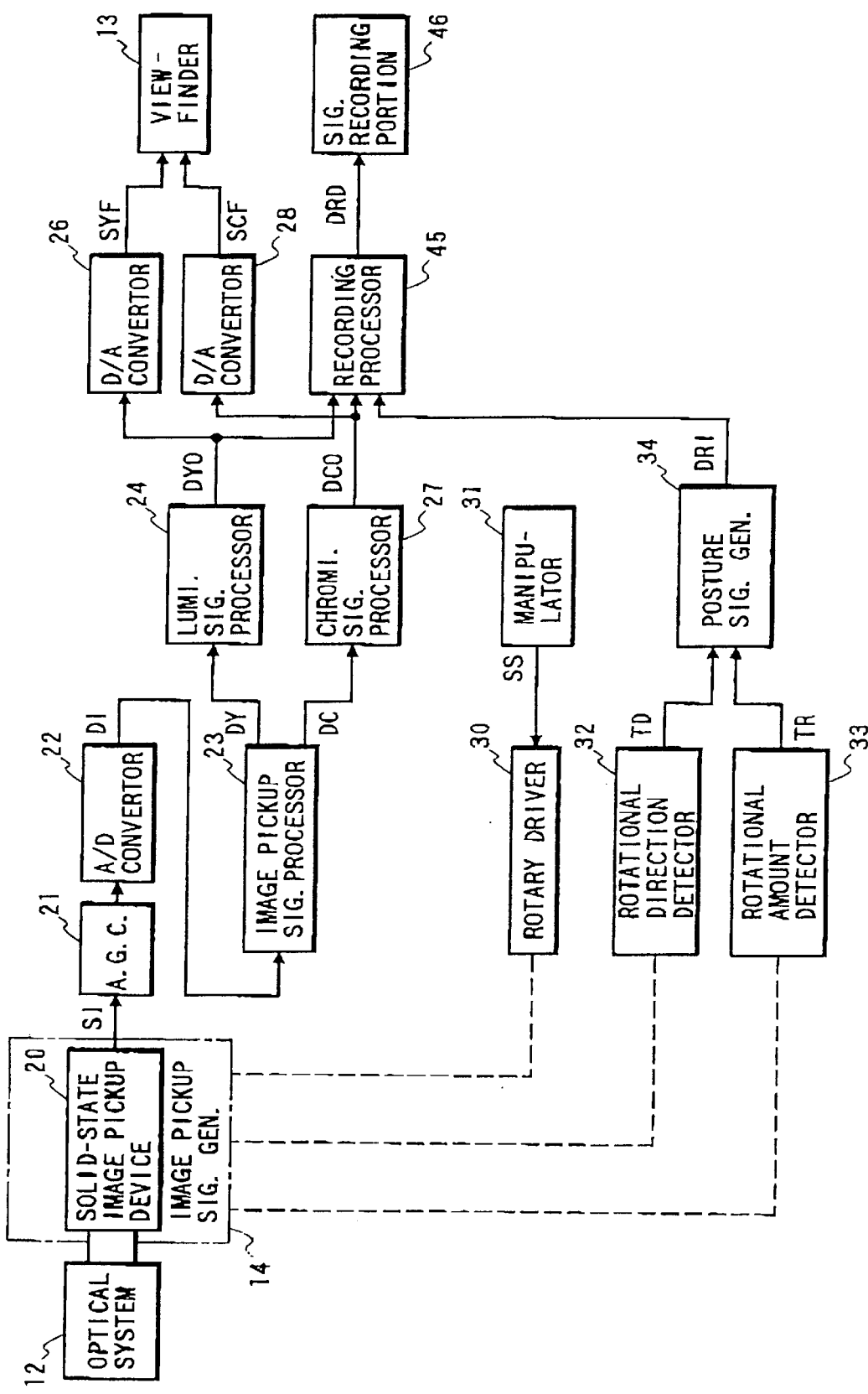
FIG. 6 is a block diagram showing another embodiment of image pickup apparatus according to the present invention.

FIG. 6 shows schematically the structure of another embodiment of image pickup apparatus according to the present invention. This embodiment shown in FIG. 6 has also such an external appearance as shown in FIGS. 2 and 3 and various portions constituted in the same manner as the embodiment shown in FIGS. 4A and 4B. In FIG. 6, blocks and signals corresponding to those shown in FIGS. 4A and 4B are marked with the same references and further description thereof will be omitted.

Referring to FIG. 6, a digital luminance signal DYO obtained from a luminance signal processor 24 is supplied to a D/A convertor 26 and a recording processor 45, a digital chrominance signal DCO obtained from a chrominance signal processor 27 is supplied to a D/A convertor 28 and the recording processor 45, and a posture signal DRI obtained from a posture signal generator 34 which forms a posture detector for detecting a posture of an image pickup signal generator 14, together with a rotational direction detector 32 and a rotational amount detector 33, is supplied to the recording processor 45. In the recording processor 45, the digital luminance signal DYO, digital chrominance signal DCO and posture signal DRI are subjected to various signal processings for recording on a recording medium, such as a magnetic disc, a writable optical disc, a magneto-optical disc, a semiconductor memory and so on, to produce a recording signal DRD.

Figure 7:
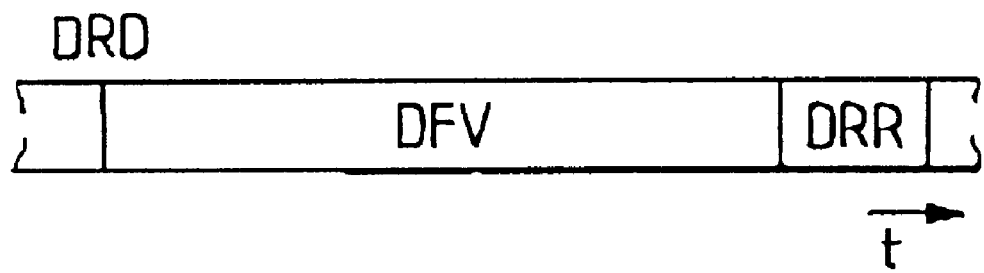
FIG. 7 is an illustration used for explaining a recording signal formed in a recording processing portion employed in the embodiment shown in FIG. 6.

The recording signal DRD obtained from the recording processor 45 is formed with a train of a plurality of digital signal segments each comprising a frame period DFV composed of the digital luminance signal DYO and digital chrominance signal DCO and a revised posture signal DRR obtained based on the posture signal DRI combined with each other in the manner of time-division multiplex, as shown in FIG. 7 (t represents time). This recording signal DRD is supplied to a signal recording portion 46 to be recorded on the recording medium therein.

As described above, in the embodiment shown in FIG. 6, under a condition in which the image pickup signal generator 14 is set to take up the reference position with which the image pickup signal generator 14 is not rotated in relation to the body 11 or the position with which the image pickup signal generator 14 is rotated in relation to the body 11 from the reference position, the digital luminance signal DYO and digital chrominance signal DCO constituting a color video signal which represents a subject from which an image pickup signal SI is generated by a solid-state image pickup device 20 in the image pickup signal generator 14 and the posture signal DRI corresponding to the posture of the image pickup signal generator 14 which is represented with the rotational direction and amount of the image pickup signal generator 14, are obtained and recorded on the recording medium by the recording processor 45 and signal recording portion 46.

The recording medium on which the recording signal DRD formed based on the digital luminance signal DYO, digital chrominance signal DCO and posture signal DRI is recorded in the signal recording portion 46 is used for reproduction of a color video signal by a signal reproducing apparatus.

Figure 8:
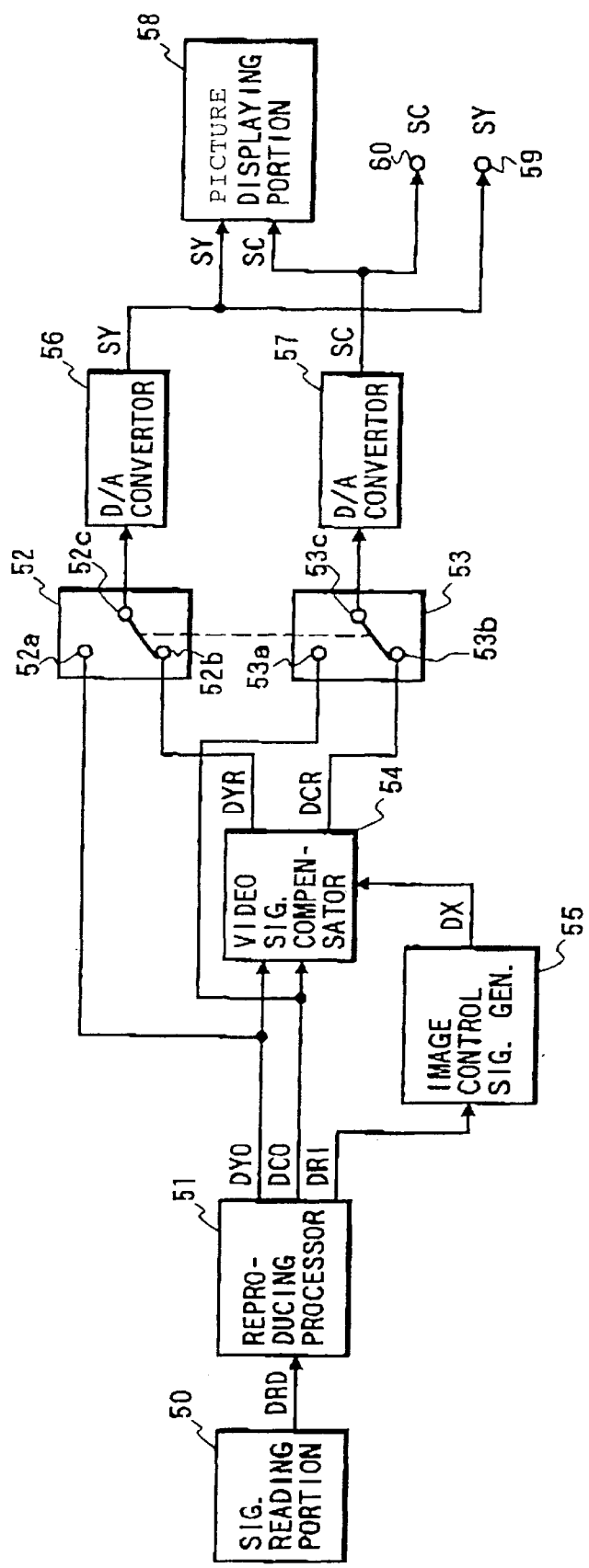
FIG. 8 is a block diagram showing an example of a video signal reproducing apparatus for reproducing a color video signal from a record medium on which the recording signal is recorded by the recording processing portion employed in the embodiment shown in FIG. 6.

FIG. 8 shows an example of signal reproducing apparatus for reproducing a color video signal from the recording medium on which the recording signal DRD is recorded in the signal recording portion 46 as mentioned above.

Referring to FIG. 8, a signal reading portion 50 is provided for reading the recording signal DRD from the recording medium on which the recording signal DRD is recorded in the signal recording portion 46 shown in FIG. 6. The recording signal DRD read from the recording medium in the signal reading portion 50 is supplied to a reproducing processor 51. In the reproducing processor 51, the recording signal DRD from the signal reading portion 50 is subjected to various signal processings and the digital luminance signal DYO, digital chrominance signal DCO and posture signal DRI are separately obtained from the recording signal DRD.

The digital luminance signal DYO and the digital chrominance signal DCO obtained from the reproducing processor 51 are supplied to a selective contact 52a of a switch 52 and a selective contact 53a of a switch 53, respectively, and further supplied to a video signal compensator 54. The posture signal DRI obtained from the reproducing processor 51 is supplied to an image control signal generator 55.

An image control signal DX is produced based on the posture signal DRI to correspond to the posture of the image pickup signal generator 14 shown in FIG. 6 which is represented with the rotational direction and amount of the image pickup signal generator 14 in the image control signal generator 55 and supplied to the video signal compensator 54. In the video signal compensator 54, the digital luminance signal DYO and digital chrominance signal DCO constituting the digital color video signal are controlled by the image control signal DX to be subjected to compensation in response to the posture represented with the rotational direction and amount of the image pickup signal generator 14 to produce a compensated digital luminance signal DYR and a compensated digital chrominance signal DCR. With this compensation to the digital luminance signal DYO and digital chrominance signal DCO with the image control signal DX, a subject represented by the compensated digital luminance signal DYR and compensated digital chrominance signal DCR is rotated, compared with the subject represented by the digital luminance signal DYO and digital chrominance signal DCO, by a certain rotational amount substantially equal to the rotational amount of the image pickup signal generator 14 in a rotational direction opposite to the rotational direction of the image pickup signal generator 14.

The compensated digital luminance signal DYR and compensated digital chrominance signal DCR obtained from the video signal compensator 54 are supplied to a selective contact 52b of the switch 52 and a selective contact 53b of the switch 53, respectively. A movable contact 52c of the switch 52 and a movable contact 53c of the switch 53 are linked in operation with each other.

When the movable contact 52c is connected with the selective contact 52a in the switch 52 and simultaneously the movable contact 53c is connected with the selective contact 53a in the switch 53, the digital luminance signal DYO and digital chrominance signal DCO obtained from the reproducing processor 51 are obtained at the movable contact 52c of the switch 52 and the movable contact 53c of the switch 53, respectively. The digital luminance signal DYO obtained at the movable contact 52c of the switch 52 is converted into an analog luminance signal SY in a D/A convertor 56 and the digital chrominance signal OCO obtained at the movable contact 53c of the switch 53 is converted into an analog chrominance signal SC in a D/A convertor 57.

On the other hand, when the movable contact 52c is connected with the selective contact 52b in the switch 52 and simultaneously the movable contact 53c is connected with the selective contact 53b in the switch 53, the compensated digital luminance signal DYR and compensated digital chrominance signal OCR obtained from the video signal compensator 54 are obtained at the movable contact 52c of the switch 52 and the movable contact 53c of the switch 53, respectively. The compensated digital luminance signal DYR obtained at the movable contact 52c of the switch 52 is converted into the analog luminance signal SY in the D/A convertor 56 and the compensated digital chrominance signal DCR obtained at the movable contact 53c of the switch 53 is converted into the analog chrominance signal SC in the D/A convertor 57.

The analog luminance signal SY obtained based on the digital luminance signal DYO or the compensated digital luminance signal DYR and the analog chrominance signal SC obtained based on the digital chrominance signal DCO or the compensated digital chrominance signal DCR, which constitute an analog color video signal, are supplied to a picture displaying portion 58 and transferred to video signal output terminals 59 and 60, respectively. In the picture displaying portion 58, a picture represented by the color video signal which is constituted with the analog luminance signal SY based on the digital luminance signal DYO and the analog chrominance signal SC based on the digital chrominance signal DCO is displayed to be reproduced when the movable contact 52c is connected with the selective contact 52a in the switch 52 and simultaneously the movable contact 53c is connected with the selective contact 53a in the switch 53, and a picture represented by the color video signal which is constituted with the analog luminance signal SY based on the compensated digital luminance signal DYR and the analog chrominance signal SC based on the compensated digital chrominance signal DCR is displayed to be reproduced when the movable contact 52c is connected with the selective contact 52b in the switch 52 and simultaneously the movable contact 53c is connected with the selective contact 53b in the switch 53.

The picture represented by the color video signal which is constituted with the analog luminance signal SY based on the digital luminance signal DYO and the analog chrominance signal SC based on the digital chrominance signal DCO corresponds directly to the subject from which the image pickup signal SI is generated by the solid-state image pickup device 20 in the image pickup signal generator 14 shown in FIG. 6. On the other hand, the picture represented by the color video signal which is constituted with the analog luminance signal SY based on the compensated digital luminance signal DYR and the analog chrominance signal SC based on the compensated digital chrominance signal DCR corresponds to the subject which is rotated by the rotational amount substantially equal to the rotational amount of the image pickup signal generator 14 in the rotational direction opposite to the rotational direction of the image pickup signal generator 14, compared with the subject from which the image pickup signal SI is generated by the solid-state image pickup device 20 in the image pickup signal generator 14.

Although, in each of the embodiment shown in FIGS. 4A and 4B and the embodiment shown in FIG. 6 aforementioned, the body 11 is set for the image pickup operation to take up the posture with which each of the parallel longer sides of the rectangular image pickup frame 15 lies in the horizontal direction when the image pickup signal generator 14 takes up the reference position, the image pickup apparatus according to the present invention should not be limited to such embodiments and it is also possible to such an arrangement that the body 11 is set for the image pickup operation to take up another posture with which each of the parallel longer sides of the rectangular image pickup frame 15 lies in the vertical direction when the image pickup signal generator 14 takes up the reference position.

Figure 9:
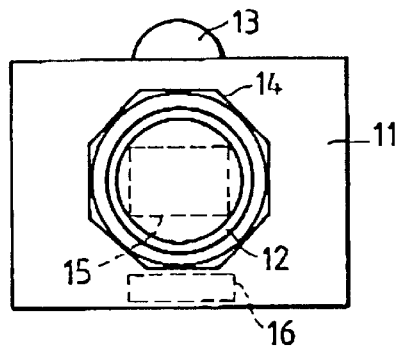
FIG. 9 is a schematic front view showing a further embodiment of image pickup apparatus according to the present invention.

FIG. 9 shows a front external view of an example of video signal producing portion constituting partially a further embodiment of image pickup apparatus according to the present invention.

Referring to FIG. 9, a video signal producing portion has a body 11 on which an optical system 12 and a viewfinder 13 which are the same as those employed in the embodiment shown in FIGS. 2 and 3 are mounted. Further, an image pickup signal generator 14 which is the same as that employed in the embodiment shown in FIGS. 2 and 3 is attached to the body 11 and a posture detecting portion 16 for detecting a posture of the body 11 is provided in the body 11.

Figure 10:
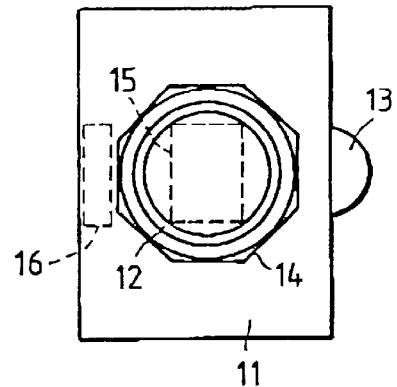
FIG. 10 is a schematic front view showing a further embodiment of image pickup apparatus according to the present invention.

The body 11 is able to take up selectively a normal posture as shown in FIG. 9 with which each of a pair of parallel longer sides of a rectangular image pickup frame 15 lies in the horizontal direction and such a posture as shown in FIG. 10 with which each of the parallel longer sides of the rectangular image pickup frame 15 lies in any direction which is rotated clockwise or counterclockwise by a certain rotational amount from the horizontal direction and includes the vertical direction when an image pickup operation is carried out by the image pickup signal generator 14. The posture detecting portion 16 is operative to detect the normal posture and the posture rotated from the normal posture of the body 11 and produce a detection output signal representing the posture detected thereby.

Figure 11:
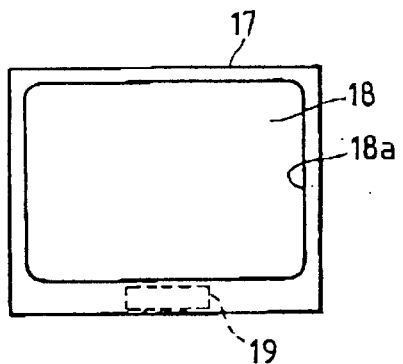
FIG. 11 is a schematic front view showing an example of a picture displaying portion constituting a further embodiment of image pickup apparatus according to the present invention.

FIG. 11 shows a front external view of an example of picture displaying portion constituting, together with the video signal producing portion shown in FIG. 9, the further embodiment of image pickup apparatus according to the present invention.

Referring to FIG. 11, a picture displaying portion 17 has a rectangular flat displaying panel portion 18 which comprises, for example, a liquid crystal displaying panel and a posture detecting portion 19 for detecting a posture of the picture displaying portion 17 provided therein. The peripheral part of the rectangular flat displaying panel portion 18 forms a picture displaying frame 18a in which a picture represented by a video signal obtained from the video signal producing portion shown in FIGS. 9 and 10 is displayed to be reproduced.

Figure 12:
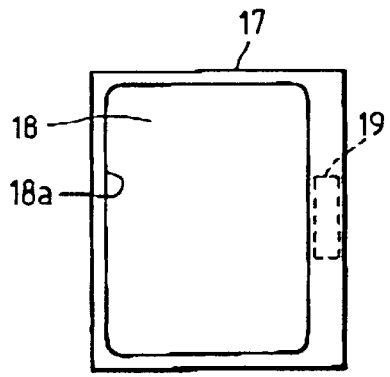
FIG. 12 is a schematic front view showing an example of a picture displaying portion constituting a further embodiment of image pickup apparatus according to the present invention.

The picture displaying portion 17 is able to take up selectively a normal posture as shown in FIG. 11 with which each of a pair of parallel longer sides of the rectangular flat displaying panel portion 18 lies in the horizontal direction and such a posture as shown in FIG. 12 with which each of the parallel longer sides of the rectangular flat displaying panel portion 18 lies in any direction which is rotated clockwise or counterclockwise by a certain rotational amount from the horizontal direction and includes the vertical direction when the picture represented by the video signal obtained from the video signal producing portion shown in FIGS. 9 and 10 is displayed to be reproduced in the picture displaying frame 18a. The posture detecting portion 19 is operative to detect the normal posture and the posture rotated from the normal posture of the picture displaying portion 17 and produce a detection output signal representing the posture detected thereby.

Figure 13A:
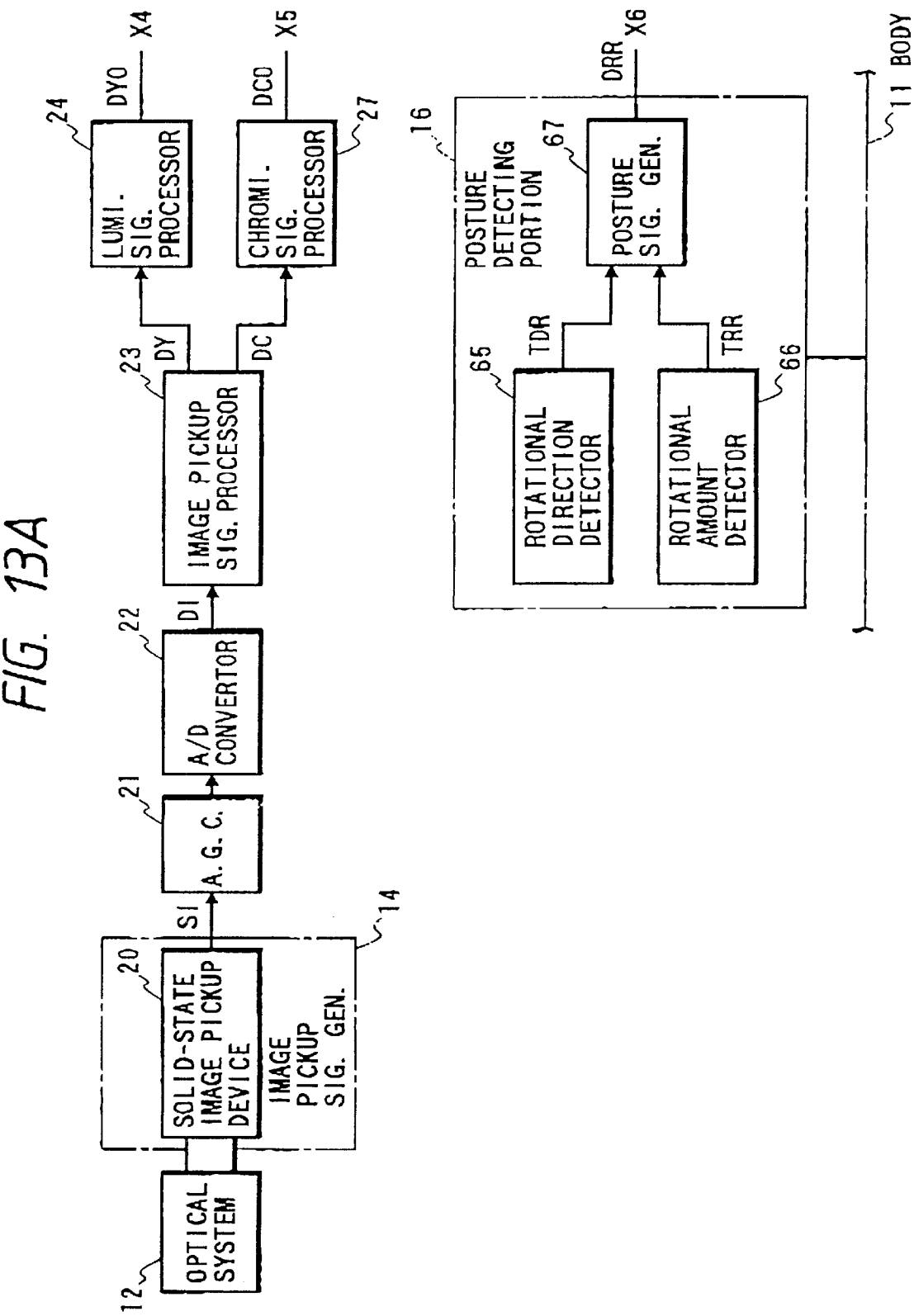
FIGS. 13A and 13B are block diagrams showing a further embodiment of image pickup apparatus according to the present invention.
Figure 13B:
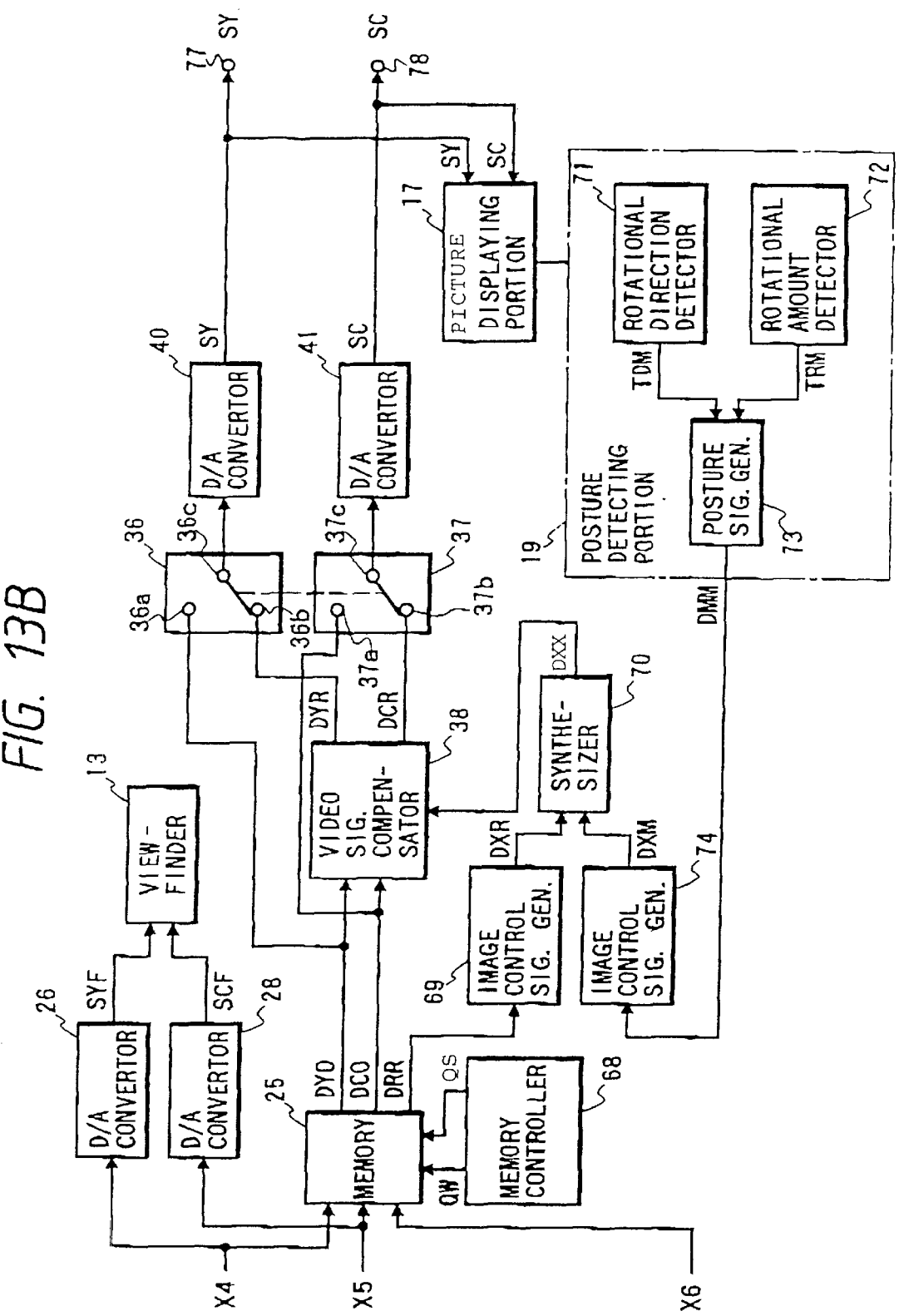

FIGS. 13A and 13B show schematically the structure of the further embodiment of image pickup apparatus according to the present invention, which includes the video signal producing portion having its external appearance as shown in FIGS. 9 and 10 and the picture displaying portion 17 having its external appearance as shown in FIGS. 11 and 12.

The embodiment shown in FIGS. 13A and 13B has various portions constituted in the same manner as the embodiment shown in FIGS. 4A and 4B. In FIGS. 13A and 13B, blocks and signals corresponding to those shown in FIGS. 4A and 4B are marked with the same references and further description thereof will be omitted.

Referring to FIGS. 13A and 13B, the posture detecting portion 16 contained in the body 11 of the video signal producing portion includes a rotational direction detector 65, a rotational amount detector 66 and a posture signal generator 67. The rotational direction detector 65 is operative to detect a rotational direction of the body 11 and produce a detection output signal TDR corresponding to the rotational direction detected thereby when the body 11 is rotated to take up the normal posture or the posture rotated from the normal posture. The rotational amount detector 66 is operative to detect a rotational amount represented with angle of rotation of the body 11 which is rotated to take up the normal posture or the posture rotated from the normal posture and produce a detection output signal TRR corresponding to the rotational amount detected thereby. The detection output signal TDR derived from the rotational direction detector 65 and the detection output signal TRR derived from the rotational amount detector 66 are supplied to the posture signal generator 67. In the posture signal generator 67, a posture signal DRR representing the rotational direction and amount of the body 11 is formed based on the detection output signals TDR and TRR so as to be the detection output signal from the posture detecting portion 16. The posture signal DRR obtained from the posture signal generator 67 is supplied to a memory 25.

The memory 25 is accompanied with a memory controller 68 for supplying the memory 25 with a writing control signal QW and a reading control signal QS. A digital luminance signal DYO from a luminance signal processor 24, a digital chrominance signal DCO from a chrominance signal processor 27 and the posture signal DRR from the posture signal generator 67 in the posture detecting portion 16 are written to be stored in the memory 25 in accordance with the writing control signal QW, and each of the digital luminance signal DYO, the digital chrominance signal DCO and the posture signal DRR stored in the memory 25 is read from the memory 25 in accordance with the reading control signal QS.

The digital luminance signal DYO and the digital chrominance signal DCO read from the memory 25 are supplied to a selective contact 36a of a switch 36 and a selective contact 37a of a switch 37, respectively, and further supplied to a video signal compensator 38. The posture signal DRR read from the memory 25 is supplied to an image control signal generator 69. An image control signal DXR is produced to correspond to the rotational direction and amount of the body 11 represented by the posture signal DRR in the image control signal generator 69 and supplied to a synthesizer 70.

Further, the posture detecting portion 19 contained in the picture displaying portion 17 includes a rotational direction detector 71, a rotational amount detector 72 and a posture signal generator 73. The rotational direction detector 71 is operative to detect a rotational direction of the picture displaying portion 17 and produce a detection output signal TDM corresponding to the rotational direction detected thereby when the picture displaying portion 17 is rotated to take up the normal posture or the posture rotated from the normal posture. The rotational amount detector 72 is operative to detect a rotational amount represented with angle of rotation of the picture displaying portion 17 which is rotated to take up the normal posture or the posture rotated from the normal posture and produce a detection output signal TRM corresponding to the rotational amount detected thereby. The detection output signal TDM derived from the rotational direction detector 71 and the detection output signal TRM derived from the rotational amount detector 72 are supplied to the posture signal generator 73. In the posture signal generator 73, a posture signal DMM representing the rotational direction and amount of the picture displaying portion 17 is formed based on the detection output signals TDM and TRM so as to be the detection output signal from the posture detecting portion 19. The posture signal DMM obtained from the posture signal generator 73 is supplied to an image control signal generator 74. An image control signal DXM is produced to correspond to the rotational direction and amount of the picture displaying portion 17 represented by the posture signal DMM in the image control signal generator 74 and supplied to the synthesizer 70.

In the synthesizer 70, the image control signal DXR corresponding to the rotational direction and amount of the body 11 and the image control signal DXM corresponding to the rotational direction and amount of the picture displaying portion 17 are synthesized to produce a composite image control signal DXX. The composite image control signal DXX obtained from the synthesizer 70 is supplied to the video signal compensator 38.

In the video signal compensator 38, the digital luminance signal DYO and digital chrominance signal DCO constituting the digital color video signal are controlled by the composite image control signal DXX to be subjected to compensation in response to the rotational direction and amount of the body 11 represented by the posture signal DRR and also to compensation in response to the rotational direction and amount of the picture displaying portion 17 represented by the posture signal DMM, so as to produce a compensated digital luminance signal DYR and a compensated digital chrominance signal DCR. With this compensation to the digital luminance signal DYO and digital chrominance signal DCO with the composite image control signal DXX, a subject represented by the compensated digital luminance signal DYR and compensated digital chrominance signal DCR is rotated, compared with a subject represented by the digital luminance signal DYO and digital chrominance signal DCO, in response to the posture of the body 11 detected by the posture detecting portion 16, for example, by a certain rotational amount substantially equal to the rotational amount of the body 11 in the same rotational direction as that of the body 11, and also in response to the posture of the picture displaying portion 17 detected by the posture detecting portion 19, for example, by a certain rotational amount substantially equal to the rotational amount of the picture displaying portion 17 in a rotational direction opposite to the rotational direction of the picture displaying portion 17.

The compensated digital luminance signal DYR and compensated digital chrominance signal DCR obtained from the video signal compensator 38 are supplied to a selective contact 36b of the switch 36 and a selective contact 37b of the switch 37, respectively. A movable contact 36c of the switch 36 and a movable contact 37c of the switch 37 are linked in operation with each other.

When the movable contact 36c is connected with the selective contact 36a in the switch 36 and simultaneously the movable contact 37c is connected with the selective contact 37a in the switch 37, the digital luminance signal DYO and digital chrominance signal DCO read from the memory 25 are obtained at the movable contact 36c of the switch 36 and the movable contact 37c of the switch 37, respectively. The digital luminance signal DYO obtained at the movable contact 36c of the switch 36 is converted into an analog luminance signal SY in a D/A convertor 40 and the digital chrominance signal DCO obtained at the movable contact 37c of the switch 37 is converted into an analog chrominance signal SC in a D/A convertor 41.

On the other hand, when the movable contact 36c is connected with the selective contact 36b in the switch 36 and simultaneously the movable contact 37c is connected with the selective contact 37b in the switch 37, the compensated digital luminance signal DYR and compensated digital chrominance signal DCR obtained from the video signal compensator 38 are obtained at the movable contact 36c of the switch 36 and the movable contact 37c of the switch 37, respectively. The compensated digital luminance signal DYR obtained at the movable contact 36c of the switch 36 is converted into the analog luminance signal SY in the D/A convertor 40 and the compensated digital chrominance signal DCR obtained at the movable contact 37c of the switch 37 is converted into the analog chrominance signal SC in the D/A convertor 41.

The analog luminance signal SY obtained based on the digital luminance signal DYO or the compensated digital luminance signal DYR and the analog chrominance signal SC obtained based on the digital chrominance signal DCO or the compensated digital chrominance signal DCR, which constitute an analog color video signal, are supplied to the picture displaying portion 17 and transferred to video signal output terminals 77 and 78, respectively. Accordingly, the switch 36, switch 37, D/A converter 40 and D/A converter 41 in the aggregate constitute a video signal supplying portion which is operative to supply the picture displaying portion 17 selectively with the digital color video signal composed of the digital luminance signal DYO and the digital chrominance signal DCO read from the memory 25 and with the digital color video signal composed of the compensated digital luminance signal DYR and the compensated digital chrominance signal DCR obtained from the video signal compensator 38.

In the picture displaying portion 17, a picture represented by the color video signal which is constituted with the analog luminance signal SY based on the digital luminance signal DYO and the analog chrominance signal SC based on the digital chrominance signal DCO is displayed to be reproduced when the movable contact 36c is connected with the selective contact 36a in the switch 36 and simultaneously the movable contact 37c is connected with the selective contact 37a in the switch 37, and a picture represented by the color video signal which is constituted with the analog luminance signal SY based on the compensated digital luminance signal DYR and the analog chrominance signal SC based on the compensated digital chrominance signal DCR is displayed to be reproduced when the movable contact 36c is connected with the selective contact 36b in the switch 36 and simultaneously the movable contact 37c is connected with the selective contact 37b in the switch 37.

The picture represented by the color video signal which is constituted with the analog luminance signal SY based on the digital luminance signal DYO and the analog chrominance signal SC based on the digital chrominance signal DCO corresponds directly to the subject from which the image pickup signal SI is generated by the solid-state image pickup device 20 in the image pickup signal generator 14. On the other hand, the picture represented by the color video signal which is constituted with the analog luminance signal SY based on the compensated digital luminance signal DYR and the analog chrominance signal SC based on the compensated digital chrominance signal DCR corresponds to the subject which is rotated, compared with the subject from which the image pickup signal SI is generated by the solid-state image pickup device 20 in the image pickup signal generator 14, in response to the posture of the body 11 detected by the posture detecting portion 16, for example, by a certain rotational amount substantially equal to the rotational amount of the body 11 in the same rotational direction as that of the body 11, and also in response to the posture of the picture displaying portion 17 detected by the posture detecting portion 19, for example, by a certain rotational amount substantially equal to the rotational amount of the picture displaying portion 17 in a rotational direction opposite to the rotational direction of the picture displaying portion 17.

In such a manner as mentioned above, under a condition in which the body 11 of the video signal producing portion is set to take up the normal posture or the posture rotated from the normal posture and the picture displaying portion 17 is also set to take up the normal posture or the posture rotated from the normal posture, the digital luminance signal DYO and digital chrominance signal DCO constituting the color video signal which represents the subject from which the image pickup signal SI is generated by the solid-state image pickup device 20 in the image pickup signal generator 14, the posture signal DRR corresponding to the posture of the body 11 and the posture signal DMM corresponding to the posture of the picture displaying portion 17, are obtained. Then, the analog luminance signal SY and analog chrominance signal SC constituting the analog color video signal which represents the picture corresponding directly to the subject from which the image pickup signal SI is generated by the solid-state image pickup device 20 in the image pickup signal generator 14 or corresponding to the subject which is rotated, compared with the subject from which the image pickup signal SI is generated by the solid-state image pickup device 20 in the image pickup signal generator 14, in response to the posture of the body 11 detected by the posture detecting portion 16, for example, by a certain rotational amount substantially equal to the rotational amount of the body 11 in the same rotational direction as that of the body 11, and also in response to the posture of the picture displaying portion 17 detected by the posture detecting portion 19, for example, by a certain rotational amount substantially equal to the rotational amount of the picture displaying portion 17 in a rotational direction opposite to the rotational direction of the picture displaying portion 17, are produced, and the picture represented by the analog luminance signal SY and analog chrominance signal SC is displayed the picture displaying portion 17.

Figure 14A:
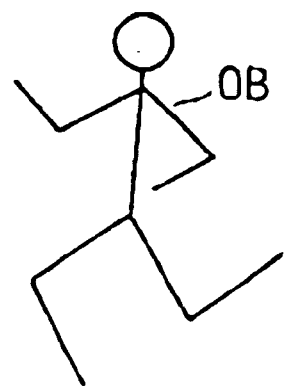
FIGS. 14A to 14D are illustrations used for explaining an image pickup and picture displaying operation of the embodiment shown in FIGS. 13A and 13B.
Figure 14B:
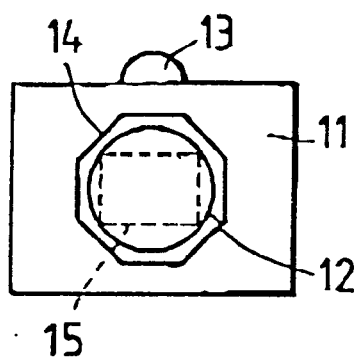
Figure 14C:
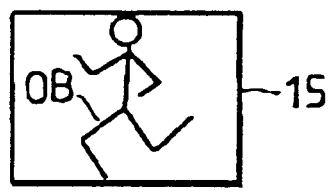

When the embodiment shown in FIGS. 13A and 13B is so set in relation to a subject OB postured as shown in FIG. 14A that the body 11 of the video signal producing portion takes up the normal posture, as shown in FIG. 14B, and the picture displaying portion 17 also takes up the normal posture, and then the solid-state image pickup device 20 in the image pickup signal generator 14 is put in the image pickup operation, the subject OB is captured in the rectangular image pickup frame 15 which has its parallel longer sides each lying in the horizontal direction and the user of the embodiment shown in FIGS. 14A and 14B looking in at the viewfinder 13 observes the subject OB which is postured without being rotated in the rectangular image pickup frame 15 having its parallel longer sides each lying in the horizontal direction, as shown in FIG. 14C.

Figure 14D:
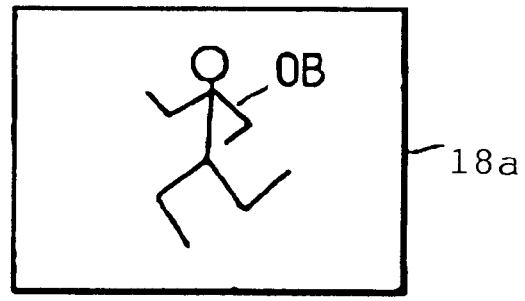

In this case, the digital luminance signal DYO and the digital chrominance signal DCO which constitute the digital color video signal representing the subject OB captured in the rectangular image pickup frame 15 having its parallel longer sides each lying in the horizontal direction are obtained from the luminance signal processor 24 and the chrominance signal processor 27, respectively. Accordingly, when the movable contact 36c is connected with the selective contact 36a in the switch 36 and simultaneously the movable contact 37c is connected with the selective contact 37a in the switch 37, the analog luminance signal SY based on the digital luminance signal DYO and analog chrominance signal SC based on the digital chrominance signal DCO are obtained from the D/A convertors 40 and 41, respectively. Consequently, a picture corresponding to the subject OB which is postured without being rotated is displayed in the picture displaying frame 18a having its parallel longer sides each lying in the horizontal direction in the picture displaying portion 17 which takes up the normal posture, as shown in FIG. 14D.

Figure 15A:
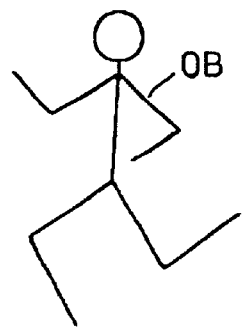
FIGS. 15A to 15E are illustrations used for explaining an image pickup and picture displaying operation of the embodiment shown in FIGS. 13A and 13B.
Figure 15B:
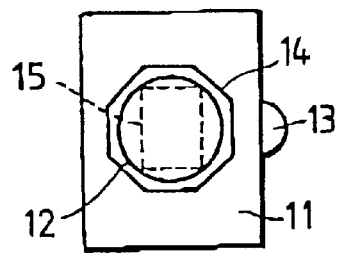
Figure 15C:
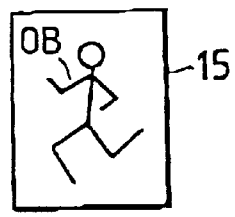

When the embodiment shown in FIGS. 13A and 13B is so set in relation to a subject OB postured as shown in FIG. 15A that the body 11 of the video signal producing portion takes up the posture rotated clockwise by 90 degrees from the normal posture, as shown in FIG. 15B, and the picture displaying portion 17 takes up the normal posture, and then the solid-state image pickup device 20 in the image pickup signal generator 14 is put in the image pickup operation, the rectangular image pickup frame 15 is rotated clockwise by 90 degrees together with the body 11 so that the subject OB is captured in the rectangular image pickup frame 15 which has its parallel longer sides each lying in the vertical direction and the user of the embodiment shown in FIGS. 15A and 15B looking in at the viewfinder 13 observes the subject OB which is postured without being rotated in the rectangular image pickup frame 15 having its parallel longer sides each lying in the vertical direction, as shown in FIG. 15C.

In this case, the digital luminance signal DYO and the digital chrominance signal DCO which constitute the digital color video signal representing the subject OB captured in the rectangular image pickup frame 15 having its parallel longer sides each lying in the vertical direction are obtained from the luminance signal processor 24 and the chrominance signal processor 27, respectively. However, a picture corresponding to the subject OB is not appropriately displayed in the picture displaying portion 17 when the movable contact 36c is connected with the selective contact 36a in the switch 36 and simultaneously the movable contact 37c is connected with the selective contact 37a in the switch 37.

Figure 15D:
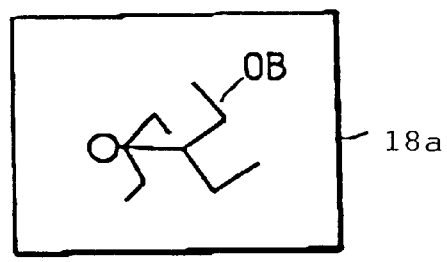

That is, when the movable contact 36c is connected with the selective contact 36a in the switch 36 and simultaneously the movable contact 37c is connected with the selective contact 37a in the switch 37, the analog luminance signal SY based on the digital luminance signal DYO and analog chrominance signal SC based on the digital chrominance signal DCO are obtained from the D/A convertors 40 and 41, respectively. Therefore, in the picture displaying portion 17 which takes up the normal posture, the picture corresponding to the subject OB which is rotated counterclockwise by 90 degrees is displayed in the picture displaying frame 18a having its parallel longer sides each lying in the horizontal direction, as shown in FIG. 15D.

Figure 15E:
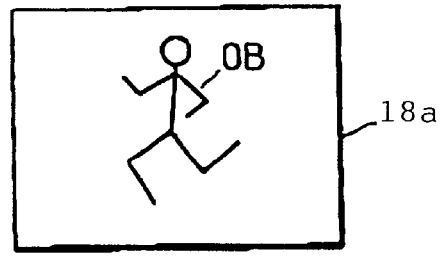

In such a situation, the compensated digital luminance signal DYR obtained through the compensation to the digital luminance signal DYO with the composite image control signal DXX and the compensated digital chrominance signal DCR obtained through the compensation to the digital chrominance signal DCO with the composite image control signal DXX, which represent the subject OB rotated clockwise by 90 degrees in response to the posture of the body 11, compared with the subject OB represented by the digital luminance signal DYO and digital chrominance signal DCO, are derived from the video signal compensator 38. Accordingly, when the movable contact 36c is connected with the selective contact 36b in the switch 36 and simultaneously the movable contact 37c is connected with the selective contact 37b in the switch 37, the analog luminance signal SY based on the compensated digital luminance signal DYR and analog chrominance signal SC based on the compensated digital chrominance signal DCR are obtained from the D/A convertors 40 and 41, respectively, to be supplied to the picture displaying portion 17. Consequently, in the picture displaying portion 17 which takes up the normal posture, a picture corresponding to the subject OB which is postured without being rotated is displayed in the picture displaying frame 18a having its parallel longer sides each lying in the horizontal direction, as shown in FIG. 15E. This picture corresponding to the subject OB is substantially the same as the picture shown in FIG. 14D.

Figure 16A:
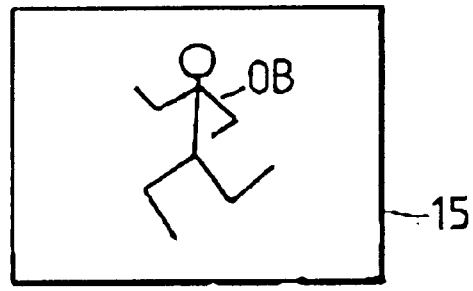
FIGS. 16A to 16C are illustrations used for explaining an image pickup and picture displaying operation of the embodiment shown in FIGS. 13A and 13B.
Figure 16B:
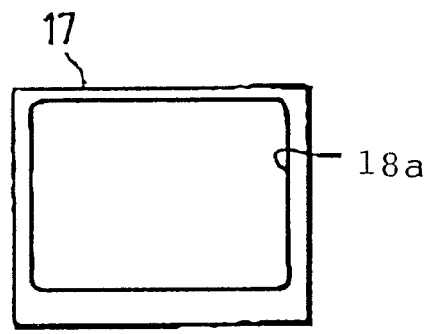
Figure 16C:
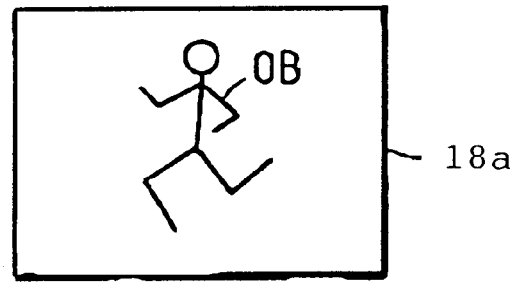

Under a condition in which the embodiment shown in FIGS. 13A and 13B is so set that the solid-state image pickup device 20 in the image pickup signal generator 14 is put in the image pickup operation with the body 11 of the video signal producing portion taking up the normal posture, so that the digital luminance signal DYO and the digital chrominance signal DCO which constitute the digital color video signal representing the subject OB captured in the rectangular image pickup frame 15 having its parallel longer sides each lying in the horizontal direction, as shown in FIG. 16A, are obtained from the luminance signal processor 24 and the chrominance signal processor 27, respectively, and the picture displaying portion 17 takes up the normal posture, as shown in FIG. 16B, the analog luminance signal SY based on the digital luminance signal DYO and analog chrominance signal SC based on the digital chrominance signal DCO are obtained from the D/A convertors 40 and 41, respectively, and thereby a picture corresponding to the subject OB which is postured without rotation is displayed in the picture displaying frame 18a having its parallel longer sides each lying in the horizontal direction in the picture displaying portion 17 which takes up the normal posture, as shown in FIG. 16C, when the movable contact 36c is connected with the selective contact 36a in the switch 36 and simultaneously the movable contact 37c is connected with the selective contact 37a in the switch 37.

Figure 17A:
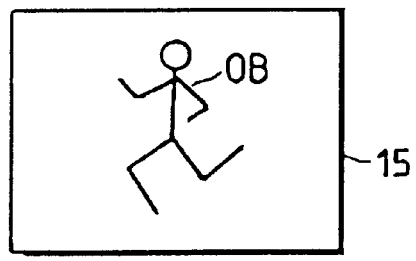
FIGS. 17A to 17D are illustrations used for explaining an image pickup and picture displaying operation of the embodiment shown in FIGS. 13A and 13B.
Figure 17B:
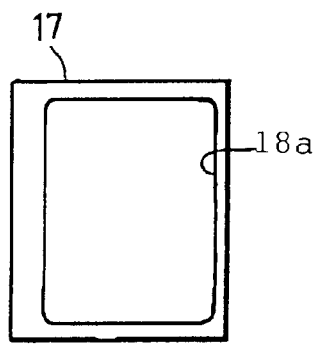

On the other hand, under a condition in which the embodiment shown in FIGS. 13A and 13B is so set that the solid-state image pickup device 20 in the image pickup signal generator 14 is put in the image pickup operation with the body 11 of the video signal producing portion taking up the normal posture, so that the digital luminance signal DYO and the digital chrominance signal DCO which constitute the digital color video signal representing the subject OB captured in the rectangular image pickup frame 15 having its parallel longer sides each lying in the horizontal direction, as shown in FIG. 17A, are obtained from the luminance signal processor 24 and the chrominance signal processor 27, respectively, and the picture displaying portion 17 takes up the posture rotated counterclockwise by 90 degrees from the normal posture, as shown in FIG. 17B, a picture corresponding to the subject OB is not appropriately displayed in the picture displaying portion 17 when the movable contact 36c is connected with the selective contact 36a in the switch 36 and simultaneously the movable contact 37c is connected with the selective contact 37a in the switch 37.

Figure 17C:
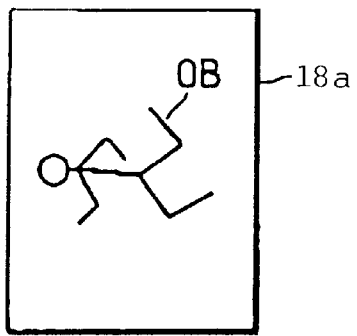

That is, when the movable contact 36c is connected with the selective contact 36a in the switch 36 and simultaneously the movable contact 37c is connected with the selective contact 37a in the switch 37, the analog luminance signal SY based on the digital luminance signal DYO and the analog chrominance signal SC based on the digital chrominance signal DCO are obtained from the D/A convertors 40 and 41, respectively, to be supplied to the picture displaying portion 17. Therefore, in the picture displaying portion 17 which takes up the posture rotated counterclockwise by 90 degrees from the normal posture, the picture corresponding to the subject OB which is rotated counterclockwise by 90 degrees is displayed in the picture displaying frame 18a which is rotated together with the picture displaying portion 17 to have its parallel longer sides each lying in the vertical direction, as shown in FIG. 17C.

Figure 17D:
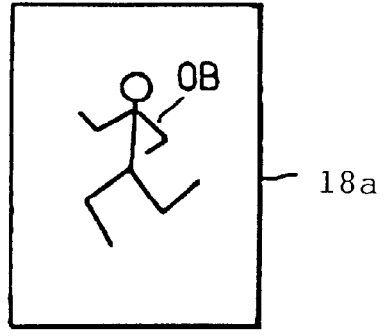

In such a situation, the compensated digital luminance signal DYR obtained through the compensation to the digital luminance signal DYO with the composite image control signal DXX and the compensated digital chrominance signal DCR obtained through the compensation to the digital chrominance signal DCO with the composite image control signal DXX, which represent the subject OB rotated clockwise by 90 degrees in response to the posture of the picture displaying portion 17, compared with the subject OB represented by the digital luminance signal DYO and digital chrominance signal DCO, are derived from the video signal compensator 38. Accordingly, when the movable contact 36c is connected with the selective contact 36b in the switch 36 and simultaneously the movable contact 37c is connected with the selective contact 37b in the switch 37, the analog luminance signal SY based on the compensated digital luminance signal DYR and analog chrominance signal SC based on the compensated digital chrominance signal DCR are obtained from the D/A convertors 40 and 41, respectively, to be supplied to the picture displaying portion 17. Consequently, in the picture displaying portion 17 which takes up the posture rotated counterclockwise by 90 degrees from the normal posture, a picture corresponding to the subject OB which is postured without being rotated is displayed in the picture displaying frame 18a which is rotated together with the picture displaying portion 17 to have its parallel longer sides each lying in the vertical direction, as shown in FIG. 17D. This picture corresponding to the subject OB is substantially the same as the picture shown in FIG. 16C.

As described above, with the embodiment shown in FIGS. 13A and 13B, when the solid-state image pickup device 20 in the image pickup signal generator 14 is put in the image pickup operation with the body 11 of the video signal producing portion taking up the normal posture or the posture rotated from the normal posture and the picture displaying portion 17 taking up the normal posture or the posture rotated from the normal posture, a condition in which the movable contact 36c is connected with the selective contact 36a in the switch 36 and simultaneously the movable contact 37c is connected with the selective contact 37a in the switch 37 and another condition in which the movable contact 36c is connected with the selective contact 36b in the switch 36 and simultaneously the movable contact 37c is connected with the selective contact 37b in the switch 37 are selectively set so that the picture corresponding to the subject OB and displayed in the picture displaying portion 17 is effectively prevented from being undesirably rotated in posture clockwise or counterclockwise in response to variations in posture of each of the body 11 of the video signal producing portion and the picture displaying portion 17 in the image pickup operation. For example, even in the case where at least one of the body 11 of the video signal producing portion and the picture displaying portion 17 takes up the posture rotated clockwise or counterclockwise from the normal posture, the picture corresponding to the subject OB which is postured without being rotated is appropriately displayed in the same manner as the picture displayed under the condition in which each of the body 11 of the video signal producing portion and the picture displaying portion 17 takes up the normal posture.

What is claimed is:

1. An image pickup apparatus comprising;
    video signal producing means including a body on which an optical system is mounted to face toward a subject, image pickup signal generating means provided in said body for generating an image pickup signal in response to a subject image obtained through the optical system and image pickup signal processing means provided in the said body for producing a video signal on the basis of the image pickup signal obtained from said image pickup signal generating means,
    first posture detecting means for producing a first posture signal representing a posture of said body constituting said video signal producing means,
    picture displaying means for displaying the video signal obtained from said video signal producing means,
    second posture detecting means for producing a second posture signal representing a posture of said picture displaying means,
    video signal compensating means for compensating the video signal obtained from said video signal producing means with the first and second posture signals to produce a compensated video signal, and
    video signal supplying means operative to supply said picture displaying means with the compensated video signal obtained from said video signal compensating means.

2. An image pickup apparatus according to claim 1, wherein said video signal supplying means is operative to supply said picture displaying means selectively with the video signal obtained from said video signal producing means and the compensated video signal obtained from said video signal compensating means.

3. An image pickup apparatus according to claim 1 further comprising memory means for storing the video signal obtained from said video signal producing means and the first posture signal obtained from said first posture detecting means to be read therefrom as occasion demands, wherein said video signal compensating means is operative to compensate the video signal read from said memory means with the first posture signal read from said memory means and the second posture signal obtained from said second posture detecting means.

4. An image pickup apparatus according to claim 1 further comprising first image control signal generating means for producing a first image control signal based on the first posture signal obtained from said first posture detecting means and second image control signal generating means for producing a second image control signal based on the a second posture signal obtained from said second posture detecting means, wherein said video signal compensating means is operative to compensate the video signal obtained from said video signal producing means with the first and second image control signals.

5. An image pickup apparatus according to claim 4 further comprising synthesizing means for synthesizing the first image control signal obtained from said first image control signal generating means and the second image control signal obtained from said second image control signal generating means to be supplied to said video signal compensating means.

6. An image pickup apparatus according to claim 1, wherein said first posture detecting means is operative to detect a rotational direction and rotational amount of said body with reference to a normal posture of said body and produce the first posture signal based on the rotational direction and rotational amount detected thereby and said second posture detecting means is operative to detect a rotational direction and rotational amount of said picture displaying means with reference to a normal posture of said picture displaying means and produce the second posture signal based on the rotational direction and rotational amount detected thereby.

7. An image pickup apparatus according to claim 6, wherein said video signal compensating means is operative to compensate the video signal obtained from said video signal producing means with the first posture signal obtained from said first posture detecting means and the second posture signal obtained from said second posture detecting means in such a manner that the picture corresponding to the subject represented by the video signal is rotated in response to the posture of said body and the posture of said picture displaying portion.

* * * * *